(12) United States Patent
Hayashi et al.

(10) Patent No.: US 8,318,821 B2
(45) Date of Patent: Nov. 27, 2012

(54) RIGID FOAMED SYNTHETIC RESIN AND PROCESS FOR ITS PRODUCTION

(75) Inventors: Yuko Hayashi, Tokyo (JP); Hiroshi Wada, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 65 days.

(21) Appl. No.: 12/915,690

(22) Filed: Oct. 29, 2010

(65) Prior Publication Data
US 2011/0046251 A1 Feb. 24, 2011

Related U.S. Application Data

(63) Continuation of application No. PCT/JP2009/059726, filed on May 27, 2009.

(30) Foreign Application Priority Data

May 30, 2008 (JP) ................................. 2008-141795

(51) Int. Cl.
*C08G 18/28* (2006.01)
(52) U.S. Cl. ........ 521/131; 521/130; 521/134; 521/137; 521/172; 521/173; 521/174
(58) Field of Classification Search .................. 521/130, 521/131, 134, 137, 172, 173, 174
See application file for complete search history.

(56) References Cited

U.S. PATENT DOCUMENTS

| | | | | |
|---|---|---|---|---|
| 3,380,967 A | * | 4/1968 | Lowe et al. | 528/77 |
| 5,654,344 A | * | 8/1997 | Falke et al. | 521/49 |
| 5,670,554 A | * | 9/1997 | Adams et al. | 521/131 |
| 6,602,450 B1 | | 8/2003 | Sato et al. | |

FOREIGN PATENT DOCUMENTS

| | | |
|---|---|---|
| JP | 2000-038433 | 2/2000 |
| JP | 2000-226427 | 8/2000 |
| JP | 2003-277462 | 10/2003 |
| JP | 2004-002726 | 1/2004 |
| JP | 2004-137492 | 5/2004 |
| JP | 2005-041907 | 2/2005 |
| JP | 2006-321882 | 11/2006 |
| JP | 2008-088388 | 4/2008 |
| JP | 2008-088413 | 4/2008 |
| WO | 00/51800 | 9/2000 |

OTHER PUBLICATIONS

International Search Report issued Sep. 1, 2009 in PCT/JP09/059726 filed May 27, 2009.

* cited by examiner

*Primary Examiner* — John Cooney
(74) *Attorney, Agent, or Firm* — Oblon, Spivak, McClelland, Maier & Neustadt, L.L.P.

(57) ABSTRACT

Provided is a process for producing a rigid foamed synthetic resin, wherein, as a blowing agent, a hydrocarbon compound and water are used, and a rigid foamed synthetic resin provided with dimensional stability, heat insulating properties, and possibly reduced weight can be obtained. The process involves reacting a polyol (P) with a polyisocyanate (I) in the presence of a blowing agent, a foam stabilizer and a catalyst, wherein the blowing agent has at least a $C_{2-8}$ hydrocarbon compound and water; the polyol (P) has a specific polyesterpolyol (A), a specific polyetherpolyol (B), and a polymer-dispersed polyol (Z) having fine polymer particles (M) dispersed; and the isocyanate index of the polyol (P) and the polyisocyanate (I) is over 200 and at most 400.

20 Claims, No Drawings

RIGID FOAMED SYNTHETIC RESIN AND PROCESS FOR ITS PRODUCTION

CROSS REFERENCE TO RELATED APPLICATIONS

The present application is a continuing application based on international application PCT/JP2009/059726, filed on May 27, 2009, and claims the benefit of the filing date of Japanese Application No. 2008-141795, filed on May 30, 2008.

TECHNICAL FIELD

The present invention relates to a process for producing a rigid foamed synthetic resin.

BACKGROUND ART

A process for producing a rigid foamed synthetic resin (hereinafter sometimes referred to as "rigid foam" by reacting a polyol component with a polyisocyanate component in the presence of a blowing agent, a foam stabilizer and a catalyst, has been widely practiced. Among various rigid foams, a rigid isocyanurate foam is excellent in heat insulating properties and flame retardancy and has high strength, and it is accordingly suitably used for building material panels, etc.

As a blowing agent to be used for the process for producing such a rigid isocyanurate foam, a chlorinated fluorocarbon compound (a CFC compound) such as a chlorofluorocarbon compound or $CCl_3F$; or a chlorinated fluorohydrocarbon compound (a HCFC compound) such as a hydrochlorofluorocarbon compound or $CCl_2FCH_3$ has, for example, been used.

However, the CFC compound and the HCFC compound have such a problem that their use is restricted from the viewpoint of environmental protection.

As a blowing agent to replace such restricted compounds, it has been studied to use a hydrocarbon compound such as cyclopentane, a fluorohydrocarbon compound (a HFC compound) such as a hydrofluorocarbon compound, or water. The HFC compound may, for example, be $CF_3CH_2F$ (HFC-134a, boiling point: $-27°$ C.), $CF_3CH_2CHF_2$ (HFC-245fa, boiling point: $15°$ C.) or $CF_3CH_2CF_2CH_3$ (HFC-365mfc, boiling point: $40°$ C.).

However, the HFC compound has a high global warming potential and thus is still problematic from the viewpoint of environmental protection, and a study is being made to use, as a blowing agent, a hydrocarbon compound or water which has a low global warming potential.

In a case where a hydrocarbon compound such as cyclopentane is used as a blowing agent for a rigid isocyanurate foam, such a blowing agent has a low compatibility with an aromatic polyesterpolyol being the main polyol component, and if the amount of the blowing agent is increased, the polyester polyol and the blowing agent are likely to be separated, a foam composition before foaming tends to be non-uniform, and molding defect is likely to be observed in the molded product obtainable after foaming. If such molding defect results, no adequate heat insulating properties will be obtainable, and due to a decrease in the foam strength, the dimensional stability is likely to decrease.

To overcome such a problem, a technique has been known for improving the foam strength and the heat insulating properties by adding a specific amount of a polyetherpolyol having a high compatibility with e.g. cyclopentane. However, in order to improve the compatibility, it is required to use a polyol having a high hydroxyl value in combination, whereby the average hydroxyl value of the entire polyol component tends to be high, and accordingly, there has been a problem such that the foam density tends to be too high in a region where the isocyanate index is as high as exceeding 200.

As a method for improving the dimensional stability without increasing the foam density, Patent Documents 1 to 3 disclose a method wherein a polymer-dispersed polyol is added to a polyol component to form a rigid isocyanurate foam. Further, Patent Document 4 discloses a method wherein cyclopentane is used as a blowing agent, and potassium acetate and potassium octylate are used in combination as a nulating catalyst, to produce a rigid isocyanurate foam excellent in dimensional stability and heat insulating properties.

PRIOR ART DOCUMENTS

Patent Documents

Patent Document 1: Re-published WO2000-51800
Patent Document 2: JP-A-2004-137492
Patent Document 3: JP-A-2005-41907
Patent Document 4: JP-A-2006-321882

DISCLOSURE OF THE INVENTION

Problems to be Solved by the Invention

In Patent Documents 1 to 3, it is possible to obtain a rigid isocyanurate foam excellent in dimensional stability and processability without increasing the foam density. However, such a rigid isocyanurate foam was likely to be inadequate in heat insulating properties.

Whereas, a rigid isocyanurate foam obtainable by the production method of Patent Document 4 has a density being slightly high at a level of from 27 to 36 $kg/m^3$. Therefore, a rigid isocyanurate foam provided with both heat insulating properties and dimensional stability and further having the weight reduced, has been desired.

Therefore, it is an object of the present invention to provide a process for producing a rigid foamed synthetic resin, wherein as a blowing agent, a hydrocarbon compound and water are used and whereby it is possible to obtain a rigid foamed synthetic resin provided with both dimensional stability and heat-insulating properties, and it is possible to reduce its weight.

Means to Solve the Problems

The production process for a rigid foamed synthetic resin of the present invention is a process for producing a rigid foamed synthetic resin, which comprises reacting a polyol (P) with a polyisocyanate (I) in the presence of a blowing agent, a foam stabilizer and a catalyst, wherein as the blowing agent, at least a $C_{2-8}$ hydrocarbon compound and water are used; the polyol (P) contains a polyesterpolyol (A) having a hydroxyl value of from 100 to 400 mgKOH/g, obtainable by polycondensation of a monomer containing an aromatic compound, a polyetherpolyol (B) having an average hydroxyl value of from 100 to 500 mgKOH/g, and a polymer-dispersed polyol (Z) having fine polymer particles (M) dispersed in a base polyol (W); the content of the polyesterpolyol (A) in the polyol (P) (100 mass %) is from 50 to 95 mass %, and the total content of the polyetherpolyol (B) and the polymer-dispersed polyol (Z) in the polyol (P) (100 mass %) is from 5 to 50 mass %; the mass proportion of the fine polymer particles (M) to the total mass (100 mass %) of the polyetherpolyol (B) and the polymer-dispersed polyol (Z) is from 0.02 to 10 mass %; the isocyanate index of the polyol (P) and the polyisocyanate (I) is over 200 and at most 400; and the polyol (P) has an average hydroxyl value of from 100 to 450 mgKOH/g.

Further, in the process for producing a rigid foamed synthetic resin of the present invention, the polyetherpolyol (B) preferably contains the following polyol (B1) and/or the following polyol (B2):

Polyol (B1): a polyoxyalkylenepolyol having an average hydroxyl value of from 100 to 700 mgKOH/g, obtainable by ring-opening addition polymerization of an alkylene oxide using an aromatic compound as an initiator;

Polyol (B2): a polyoxyalkylenepolyol having an average hydroxyl value of from 100 to 800 mgKOH/g, obtainable by ring-opening addition polymerization of an alkylene oxide using an aliphatic amine and/or an alicyclic amine as an initiator.

Further, in the process for producing a rigid foamed synthetic resin of the present invention, the polyetherpolyol (B) preferably contains at least one type of the polyol (B1) wherein one member selected from the group consisting of a Mannich condensate, diaminotoluene and bisphenol A is used as the initiator.

Further, the polyetherpolyol (B) preferably contains the polyol (B2) wherein a piperazine is used as the initiator.

Further, as the hydrocarbon compound, it is preferred to use at least one member selected from the group consisting of propane, butane, n-pentane, isopentane, cyclopentane, hexane and cyclohexane.

Further, the hydrocarbon compound is preferably used in an amount of from 5 to 50 parts by mass per 100 parts by mass of the polyol (P).

Further, the content of the fine polymer particles (M) in the polyol (P) (100 mass %) is preferably from 0.001 to 5 mass %.

Further, at least 5 mass % of the base polyol (W) is preferably the following polyetherpolyol (W1):

Polyetherpolyol (W1): a polyetherpolyol having an average hydroxyl value of at most 84 mgKOH/g and an oxyethylene group content of at least 40 mass % in the entire polyetherpolyol (W1).

Further, it is preferred that the base polyol (W) has an average hydroxyl value of from 200 to 800 mgKOH/g, and the fine polymer particles (M) are fine polymer particles obtainable by polymerization of a monomer containing acrylonitrile.

Advantageous Effects of the Invention

According to the production process of the present invention, it is possible to obtain a rigid foamed synthetic resin provided with both excellent dimensional stability and heat-insulating properties and having the weight reduced, by using, as a blowing agent, a hydrocarbon compound and water.

MODE FOR CARRYING OUT THE INVENTION

The process for producing a rigid foamed synthetic resin of the present invention is a process which comprises reacting a polyol (P) with a polyisocyanate (I) in the presence of a blowing agent, a foam stabilizer and a catalyst.
<Polyol (P)>

The polyol (P) is a polyol containing a polyesterpolyol (A), a polyetherpolyol (B) and a polymer-dispersed polyol (Z).
[Polyesterpolyol (A)]

The polyesterpolyol (A) is a polyesterpolyol having a hydroxyl value of from 100 to 400 mgKOH/g, obtainable by polycondensation of a monomer containing an aromatic compound. The aromatic compound means a compound having an aromatic ring. Here, the aromatic ring may be a ring composed solely of carbon atoms or a ring containing an atom other than carbon atoms, such as a nitrogen atom. The ring composed solely of carbon atoms may, for example, be a benzene ring or a naphthalene ring. The ring containing an atom other than carbon atoms may, for example, be a pyridine ring.

The polyesterpolyol (A) is a polyesterpolyol obtainable by polycondensation of a diol component with a dibasic acid component which is a dicarboxylic acid component or its anhydride, wherein at least one of the diol component and the dibasic acid component preferably contains an aromatic ring. That is, it is preferably a polyesterpolyol obtainable by either one of polycondensation of a diol component having an aromatic ring with a dibasic acid component having no aromatic ring, polycondensation of a diol component having no aromatic ring with a dibasic acid component having an aromatic ring, and polycondensation of a diol component having an aromatic ring with a dibasic acid component having an aromatic ring.

The diol component having an aromatic ring may, for example, be a diol obtainable by ring-opening addition polymerization of bisphenol A with ethylene oxide.

The diol having no aromatic ring may, for example, be ethylene glycol, diethylene glycol or polyethylene glycol.

The dicarboxylic acid having an aromatic ring may, for example, be a phthalic acid such as terephthalic acid.

The dicarboxylic acid having no aromatic ring may, for example, be maleic acid or fumaric acid.

By using the polyesterpolyol (A), the obtainable rigid foam will have its adhesion to a substrate and flame retardancy particularly improved. The reason is considered to be such that since the polyesterpolyol (A) has an aromatic ring, it is readily carbonized during combustion to prevent fire spreading, thereby to exhibit flame retardancy effects. Further, it contains an ester group, such being effective also for an improvement of the adhesion to a substrate.

Such polyesterpolyols (A) may be used alone or in combination as a mixture of two or more of them.

The hydroxyl value of the polyesterpolyol (A) is from 100 to 400 mgKOH/g, preferably from 150 to 350 mgKOH/g, more preferably from 180 to 350 mgKOH/g. When a plurality of polyesterpolyols are used in combination as the polyesterpolyol (A), the hydroxyl value of each polyesterpolyol may be within such a range.

When the hydroxyl value of the polyesterpolyol (A) is at least 100 mgKOH/g, the obtainable rigid foam tends to scarcely shrink. On the other hand, when the hydroxyl value of the polyesterpolyol (A) is at most 400 mgKOH/g, the obtainable rigid foam has little brittleness and excellent adhesion properties. Further, the viscosity of the polyesterpolyol (A) lowers, whereby the mixing property in the polyol (P) will be good. Further, it is possible to reduce the amount of the polyisocyanate (I), and it is possible to control the foam density to be low without increasing the amount of the blowing agent to be used.

That is, when the hydroxyl value of the polyesterpolyol (A) is within the above range, it is possible to improve the dimensional stability of the rigid foam, while controlling an increase of the density of the rigid foam.

The content of the polyesterpolyol (A) in the polyol (P) (100 mass %) is from 50 to 95 mass %, preferably from 55 to 90 mass %, more preferably from 65 to 90 mass %. When the content of the polyesterpolyol (A) is at least 50 mass %, it is possible to improve the flame retardancy of the rigid foam. When the content of the polyesterpolyol (A) is at most 95 mass %, it is possible to improve the dimensional stability of the rigid foam.

[Polyetherpolyol (B)]

The polyetherpolyol (B) is a polyetherpolyol having an average hydroxyl value of from 100 to 500 mgKOH/g.

The polyetherpolyol (B) preferably contains the following polyol (B1) and/or polyol (B2). Particularly, it preferably contains at least the polyol (B1), more preferably contains the polyol (B1) and the polyol (B2).

The average hydroxyl value of the polyetherpolyol (B) is from 100 to 500 mgKOH/g, preferably from 250 to 480 mgKOH/g. When the average hydroxyl value of the polyetherpolyol (B) is at least 100 mgKOH/g, the obtainable rigid foam tends to scarcely shrink. On the other hand, when the average hydroxyl value is at most 500 mgKOH/g, it is readily possible to impart mechanical properties to the obtainable rigid foam, while controlling the viscosity of the polyol to be low. Further, it is possible to reduce the amount of the polyisocyanate (I) to be used.

In the present invention, the average hydroxyl value means, in the case of a single polyol component, the hydroxyl value of the single polyol component, and in a case where plural polyol components are contained, it means a mass average value of hydroxyl values of the respective polyol components.

The average hydroxyl value of the polyetherpolyol (B) when containing plural polyol components, is a mass averaged value of hydroxyl values of the respective polyol components. That is, for example, when the polyol (B1) and the polyol (B2) are mixed to form the polyetherpolyol (B), even if the respective average hydroxyl values of the polyol (B1) and the polyol (B2) are outside the range of from 100 to 500 mgKOH/g, if the mass averaged value of their respective average hydroxyl values is within a range of from 100 to 500 mgKOH/g, such is acceptable.

(Polyol B1)

The polyol (B1) is a polyoxyalkylene polyol having an average hydroxyl value of from 100 to 700 mgKOH/g, obtainable by ring-opening addition polymerization of an alkylene oxide using an aromatic compound as an initiator. When the polyetherpolyol (B) contains the polyol (B1), the flame retardancy of the obtainable rigid foam will be improved.

As the initiator for the polyol (B1), an aromatic compound is employed. The aromatic compound may be a condensation compound or a non-condensation compound.

The condensation compound may, for example, be a Mannich condensate as a reaction product of a phenol, an alkanolamine and an aldehyde, a resol-type initial condensate having a phenol condensed with an excessive formaldehyde in the presence of an alkali catalyst, a benzylic type initial condensate reacted in a non-aqueous system at the time of preparing such a resol-type initial condensate, or a novolac type initial condensate having an excessive phenol reacted with a formaldehyde in the presence of an acid catalyst. The molecular weights of these initial condensates are preferably from about 200 to 10,000.

The above phenol may, for example, be phenol, nonylphenol, cresol, bisphenol A or resorcinol, and the aldehyde may, for example, be formalin or paraformaldehyde.

Whereas, the non-condensation compound may, for example, be a polyhydric phenol such as bisphenol A or resorcinol; or an aromatic amine such as diaminotoluene, diethyldiaminotoluene or diaminodiphenylmethane.

Among them, as the initiator for the production of the polyol (B1), it is preferred to employ at least one member selected from the group consisting of a Mannich condensate, diaminotoluene and bisphenol A.

Further, the alkylene oxide to be used for the production of the polyol (B1) may, for example, be ethylene oxide, propylene oxide, 1,2-epoxybutane, 2,3-epoxybutane or styrene oxide. Among them, propylene oxide or ethylene oxide is preferred, and propylene oxide alone or a combination of propylene oxide with ethylene oxide is particularly preferred.

The average hydroxyl value of the polyol (B1) is from 100 to 700 mgKOH/g, preferably from 200 to 600 mgKOH/g. When the average hydroxyl value of the polyol (B1) is at least 100 mgKOH/g, the mixing property of the polyol component can easily be maintained. When the average hydroxyl value of the polyol (B1) is at most 700 mgKOH/g, a sufficient flame retardancy can easily be imparted to the rigid foam.

When a plurality of polyols are used as mixed, as the polyol (B1), the mass averaged value of their respective hydroxyl values may be within the above range, and it is preferred that their respective hydroxyl values are within the above range.

Further, the average number of functional groups in the polyol (B1) is preferably from 2 to 8, more preferably from 3 to 6.

When the average number of functional groups in the polyol (B1) is at least 2, the strength of the rigid foam can be improved. When the average number of functional groups in the polyol (B1) is at most 8, it is possible to control the viscosity of the polyol component to be low.

Such polyols (B1) may be used alone or in combination as a mixture of two or more of them.

The content of the polyol (B1) in the polyether polyol (B) (100 mass %) is preferably from 10 to 95 mass %, more preferably from 20 to 95 mass %. When the content of the polyol (B1) is within the above range, a sufficient flame retardancy can easily be imparted to the rigid foam.

(Polyol (B2))

The polyol (B2) is a polyoxyalkylene polyol having an average hydroxyl value of from 100 to 800 mgKOH/g, obtainable by ring-opening addition polymerization of an alkylene oxide using an aliphatic amine and/or an alicyclic amine as an initiator.

By using the polyol (B2), it is possible to obtain, in addition to an improvement in the reactivity with the polyisocyanate (I), such an effect that a rigid foam having a lower density can easily be produced.

The initiator to be used for the production of a polyol (B2) is an aliphatic amine and/or an alicyclic amine, and an alicyclic amine is preferred.

The aliphatic amine may, for example, be an alkylamine or an alkanolamine. The alkylamine may, for example, be ethylene diamine, propylene diamine, hexamethylene diamine, diethylene triamine or triethylene tetramine. The alkanolamine may, for example, be monoethanolamine, diethanolamine, triethanolamine, 1-amino-2-propanol or aminoethylethanolamine.

The alicyclic amine may, for example, be a piperidine, a piperazine or a pyrrolidine, preferably a piperazine, particularly preferably a piperazine substituted by an aminoalkyl group. The piperazine is highly effective as a catalyst to promote an urethane bond-forming reaction, and by using as an initiator for the polyol (B2), it is possible to obtain an effect to increase the reactivity at the time of producing a rigid foam. The piperidine may, for example, be 1-(2-aminoethyl)piperidine. The piperazine may, for example, be piperazine, N-aminomethylpiperazine or 1-(2-aminoethyl)piperazine. The pyrrolidine may, for example, be 1-(2-aminoethyl)pyrrolidine.

The alkylene oxide to be used for the production of the polyol (B2) may, for example, be ethylene oxide, propylene oxide and so on. It is particularly preferred to use only ethylene oxide. By using only ethylene oxide, the hydroxyl group in the polyol (B2) becomes a primary hydroxyl group, whereby the reactivity of the polyol (B2) becomes high, such being effective for the improvement in the adhesion property.

The average hydroxyl value of the polyol (B2) is from 100 to 800 mgKOH/g, preferably from 250 to 600 mgKOH/g. When the average hydroxyl value of the polyol (B2) is at least 100 mgKOH/g, mechanical properties can be imparted to the rigid foam. When the average hydroxyl value of the polyol (B2) is at most 800 mgKOH/g, it is possible to control the viscosity of the polyol to be low and to reduce the amount of the polyisocyanate (I) to be used.

When a plurality of polyols are used as mixed, as the polyol (B2), the mass average value of their respective hydroxyl values may be within the above range, and it is preferred that their respective hydroxyl values are within the above range.

Further, the average number of functional groups in the polyol (B2) is preferably from 2 to 8, more preferably from 3 to 6.

When the average number of functional groups in the polyol (B2) is at least 2, it is possible to improve the strength of the rigid foam. When the average number of functional groups in the polyol (B2) is at most 8 it is possible to control the viscosity of the polyol component to be low.

Such polyols (B2) may be used alone or in combination as a mixture of two or more of them.

The content of the polyol (B2) in the polyetherpolyol (B) (100 mass %) is preferably from 0.5 to 30 mass %, more preferably from 5 to 25 mass %. When the content of the polyol (B2) is at least 0.5 mass %, it is easy to improve the reactivity of the polyol (B) with the polyisocyanate (I), and it becomes easy to reduce the weight of the rigid foam. When the content of the polyol (B2) is at most 30 mass %, it is easy to improve the dimensional stability of the rigid foam.
(Polyol (B3))

The polyetherpolyol (B) may contain a polyol (B3) which is a polyetherpolyol other than the polyol (B1) and the polyol (B2).

The polyol (B3) may, for example, be a polyetherpolyol obtainable by ring-opening addition polymerization of a cyclic ether such as an alkylene oxide to an initiator such as a polyhydroxy compound such as a polyhydric alcohol, a polyhydric phenol. The average hydroxyl value is preferably from 100 to 600 mgKOH/g.

Such polyols (B3) may be used alone or in combination as a mixture of two or more of them.

The content of the polyol (B3) in the polyetherpolyol (B) (100 mass %) is preferably from 0 to 60 mass %, more preferably from 15 to 50 mass %.

A preferred polyetherpolyol (B) is a polyetherpolyol comprising from 15 to 80 mass % of the polyol (B1), from 5 to 30 mass % of the polyol (B2) and from 0 to 60 mass % of the polyol (B3) (provided that the total of (B1), (B2) and (B3) is 100 mass %).

[Polymer-Dispersed Polyol (Z)]

The polymer-dispersed polyol (Z) is a polymer-dispersed polyol having fine polymer particles (M) stably dispersed in a base polyol ON).
(Polymer Particles (M))

The fine polymer particles (M) are polymer particles obtainable by polymerizing a monomer having a polymerizable unsaturated bond. The monomer having a polymerizable unsaturated bond to be used for forming the fine polymer particles (M) may usually be a monomer having one polymerizable unsaturated bond, but is not limited thereto.

Specific examples of the monomer having a polymerizable unsaturated bond include a cyano group-containing monomer such as acrylonitrile, methacrylonitrile or 2,4-dicyanobutene-1; a styrene monomer such as styrene, α-methylstyrene or a halogenated styrene; an acrylic monomer such as acrylic acid, methacrylic acid or an alkylester thereof, acrylamide or methacrylamide; a vinyl ester monomer such as vinyl acetate or vinyl propionate; a diene monomer such as isoprene, butadiene, etc.; an unsaturated fatty acid ester such as a maleic acid diester or itaconic acid diester; a vinyl halide such as vinyl chloride, vinyl bromide or vinyl fluoride; a vinylidene halide such as vinylidene chloride, vinylidene bromide or vinylidene fluoride; a vinyl ether monomer such as methyl vinyl ether, ethyl vinyl ether or isopropyl vinyl ether; and other olefins or halogenated olefins.

The monomer having a polymerizable unsaturated bond is preferably a combination (total: 100 mass %) of from 20 to 90 mass % of acrylonitrile and from 80 to 10 mass % of another monomer. In such a case, as such another monomer, styrene, an alkylacrylate, an alkylmethacrylate or vinyl acetate is preferred. Such other monomers may be used in combination of two or more of them.

The fine polymer particles (M) have an average particle size of preferably at most 10 μm, more preferably at most 6 μm. When the average particle size of the fine polymer particles (M) is at most 10 μm, the storage stability of the polymer-dispersed polyol (Z) will be good. Further, the average particle size of the fine polymer particles (M) is preferably at least 0.01 μm.

With respect to the content of the fine polymer particles (M), the mass proportion of the fine polymer particles (M) to the total mass (100 mass %) of the polyetherpolyol (B) and the polymer-dispersed polyol (Z) is from 0.02 to 10 mass %, preferably from 0.1 to 10 mass %, particularly preferably from 0.5 to 7 mass %. When such a mass proportion of the fine polymer particles (M) is at least 0.02 mass %, the effects of the fine polymer particles (M) can be sufficiently obtained, and shrinkage of the obtainable rigid foam can effectively be restrained. On the other hand, when the content of the fine polymer particles (M) is at most 10 mass %, the storage stability of the fine polymer particles (M) will be good.

Further, the content of the fine polymer particles (M) to the polyol (P) (100 mass %) is preferably from 0.001 to 5 mass %, more preferably from 0.1 to 3 mass %, particularly preferably from 0.15 to 2.5 mass %. When such a mass proportion of the fine polymer particles (M) is at least 0.001 mass %, the effects of the fine polymer particles (M) can be sufficiently obtained, and shrinkage of the obtainable rigid foam can effectively be restrained easily. On the other hand, when the content of the fine polymer particles (M) is at most 5 mass %, it is possible to easily maintain the heat insulating properties in a good condition, while controlling shrinkage of the rigid foam.
(Base polyol (W))

The base polyol (W) for the polymer-dispersed polyol (Z) may, for example, be a polyetherpolyol, a polyesterpolyol or a hydrocarbon polymer having hydroxyl groups at its terminals and so on. The base polyol (W) is preferably composed solely of the polyetherpolyol, or a base polyol wherein a polyetherpolyol as the main component is used in combination with a small amount of a polyesterpolyol or a hydrocarbon polymer having hydroxyl groups at its terminals and so on.

The polyetherpolyol to be used as the base polyol (W) may, for example, be a polyetherpolyol obtainable by ring-opening addition polymerization of a cyclic ether such as an alkylene oxide to an initiator such as a polyhydroxy compound such as a polyhydric alcohol or a polyhydric phenol, or an amine.

Further, in the present invention, as the base polyol (W), the same polyetherpolyol as the polyetherpolyol (B) may be used, or the same polyesterpolyol as the polyesterpolyol (A) may be used. It is particularly preferred to use the same polyetherpolyol as the polyetherpolyol (B), as the base polyol (W).

The average hydroxyl value of the base polyol (W) is preferably from 200 to 800 mgKOH/g, more preferably from 250 to 750 mgKOH/g.

When the average hydroxyl value of the base polyol (W) is at least 200 mgKOH/g, the compatibility with other polyols will be good. On the other hand, when the average hydroxyl value of the base polyol (W) is at most 800 mgKOH/g, the dispersion stability of the fine polymer particles (M) will be good.

When a plurality of polyols are used as mixed, as the base polyol (W), the mass averaged value of their respective hydroxyl values may be within the above range.

Further, the base polyol (W) is preferably such that at least 5 mass % of the base polyol (W) is the following polyetherpolyol (W1).

The polyetherpolyol (W1) is a polyetherpolyol having an average hydroxyl value of at most 84 mgKOH/g and having an oxyethylene group content of at least 40 mass % in the entire polyetherpolyol (W1).

The polyetherpolyol (W1) is preferably a polyetherpolyol obtainable by using a polyhydric alcohol as an initiator and ring-opening addition polymerization of ethylene oxide, or ethylene oxide and another cyclic ether, thereto.

The polyhydric alcohol is preferably glycerol, trimethylolpropane or 1,2,6-hexanetriol. Another cyclic ether is preferably propylene oxide, isobutylene oxide, 1-butene oxide or 2-butene oxide, and propylene oxide is particularly preferred.

By using the polyetherpolyol (W1) having an average hydroxyl value of at most 84 mgKOH/g, it become possible to easily obtain a polymer-dispersed polyol (Z) wherein fine polymer particles (M) are stably dispersed. The average hydroxyl value of the polyetherpolyol (W1) is preferably at most 67 mgKOH/g, particularly preferably at most 60 mgKOH/g.

From the viewpoint of the dispersion stability of the fine polymer particles, the average hydroxyl value of the polyetherpolyol (W1) is preferably at least 5 mgKOH/g, more preferably at least 8 mgKOH/g, further preferably at least 20 mgKOH/g, particularly preferably at least 30 mgKOH/g.

When a plurality of polyols are used as mixed, as the polyol (W1), the mass averaged value of their respective hydroxyl values may be within the above range, and it is preferred that their respective hydroxyl values are within the above range.

Further, the oxyethylene group content in the entire polyetherpolyol (W1) (100 mass %) is at least 40 mass %, whereby the dispersability of the fine polymer particles (M) in the polymer-dispersed polyol (Z) can easily be achieved. Such an oxyethylene group content is preferably at least 50 mass %, further preferably at least 55 mass %. Further, such an oxyethylene group content may be about 100 mass %. That is, it may be a polyetherpolyol (W1) obtained by ring-opening addition polymerization using only ethylene oxide as the initiator. From the viewpoint of the dispersion stability of the fine polymer particles (M), such an oxyethylene group content is preferably at most 90 mass %.

Further, when the content of the polyetherpolyol (W1) in the base polyol (W) is at least 5 mass %, a polymer-dispersed polyol (Z) having good dispersability can easily be obtained. The content of the polyetherpolyol (W1) in the base polyol (W) is more preferably at least 10 mass %. There is no particular upper limit for the content of the polyetherpolyol (W1), but it is preferably set so that the average hydroxyl value of the base polyol (W) will be within a range of from 200 to 800 mgKOH/g.

Further, the base polyol (W) is preferably a mixture (total: 100 mass %) of from 5 to 50 mass % of the polyetherpolyol (W1) and from 95 to 50 mass % of a polyol (W2) having an average hydroxyl value of from 400 to 850 mgKOH/g, more preferably a mixture (total: 100 mass %) of from 5 to 45 mass % of the polyetherpolyol (W1) and from 95 to 55 mass % of the polyol (W2).

The average hydroxyl value of the polyol (N2) is from 400 to 850 mgKOH/g, preferably from 500 to 760 mgKOH/g.

When a plurality of polyols are used as mixed, as the polyol (W2), the mass averaged value of their respective hydroxyl values may be within the above range, and it is preferred that their respective hydroxyl values are within the above range.

The polyol (W2) may, for example, be one having a hydroxyl value within a range of from 400 to 850 mgKOH/g among polyols mentioned for the above base polyol (W).

The polyol (W2) is particularly preferably a polyetherpolyol obtainable by ring-opening addition polymerization of a cyclic ether to an initiator such as a polyhydric alcohol or amine. The cyclic ether is preferably propylene oxide, ethylene oxide, isobutylene oxide, 1-butene oxide or 2-butene oxide, and propylene oxide is particularly preferred.

(Process for Producing Polymer-Dispersed Polyol (Z))

As a process for producing the polymer-dispersed polyol (Z), the following two processes may be mentioned.

The first process is a process which comprises polymerizing a monomer having a polymerizable unsaturated bond in the base polyol (W) in a solvent as the case requires, to directly precipitate fine polymer particles (M). The second process is a process which comprises polymerizing a monomer having a polymerizable unsaturated bond in a solvent in the presence of a grafting agent to stabilize particles, as the case requires, to precipitate fine polymer particles (M) and then replacing the solvent with the base polyol (W) to obtain a stable dispersion. Either process may be employed in the present invention, but the former process is more preferred.

The amount of the monomer having a polymerizable unsaturated bond to be used, is preferably such that the content of fine polymer particles (M) in the polymer-dispersed polyol (W) will be from about 1 to 50 mass %, more preferably from 2 to 45 mass % further preferably from 10 to 30 mass %.

In the polymerization of the monomer having a polymerizable unsaturated bond, a polymerization initiator of a type to initiate polymerization by forming free radicals, is usually employed. Specific examples of such a polymerization initiator include, for example, 2,2'-azobis-isobutyronitrile (AIBN), 2,2'-azobis-2-methylbutyronitrile (AMBN), 2,2'-azobis-2,4-dimethylvaleronitrile, benzoyl peroxide, diisopropylperoxydicarbonate, acetyl peroxide, di-tert-butyl peroxide, and a persulfate. As the polymerization initiator, AMBN is particularly preferred.

[Process for Preparing Polyol (P)]

In the present invention, it is preferred that after preparing the polymer-dispersed polyol (Z), such a polymer-dispersed polyol (Z) is mixed with the polyesterpolyol (A) and/or the polyetherpolyol (B). In particular, on the point of dispersion stability, it is preferred that after preparing the polymer-dispersed polyol (Z), such a polymer-dispersed polyol (Z) is mixed with the polyetherpolyol (B) and then mixed with the polyesterpolyol (A). In such a case, it is preferred to employ, as the base polyol (W), a polyetherpolyol or a polyol containing a polyetherpolyol as the main component.

In the process of the present invention, the total content of the polyetherpolyol (B) and the polymer-dispersed polyol (Z) in the polyol (P) (100 mass %) is from 5 to 50 mass %, preferably from 10 to 45 mass %, more preferably from 15 to 40 mass %. When such a total content is at least 5 mass %, shrinkage of the rigid foam can effectively be suppressed. Further, when such a total content is at most 50 mass %, it is possible to maintain the heat insulating performance, while suppressing shrinkage of the rigid foam.

Further, the mass proportion of the polymer-dispersed polyol (Z) to the total mass amount of the polyetherpolyol (B) and the polymer-dispersed polyol (Z) is preferably from 0.1 to 25 mass %, more preferably from 1 to 20 mass %.

When such a mass proportion of the polymer-dispersed polyol (Z) is at least 0.1 mass %, the effect for improving the dimensional stability of the obtainable rigid foam can sufficiently be obtained. Further, the activities of the polyol will be sufficiently high, and the outer appearance of the foam can be maintained to be good. Further, when such a mass proportion of the polymer-dispersed polyol (Z) is at most 25 mass %, it becomes easy to maintain the heat insulating performance to be good, while suppressing shrinkage of the rigid foam.

(Other Polyols (C))

The polyol (P) may contain other polyols (C) which are not included in any one of the polyesterpolyol (A), the polyetherpolyol (B) and the polymer-dispersed polyol (Z).

Such polyols (C) may, for example, be a polyesterpolyol other than the polyesterpolyol (A), a polycarbonate polyol, an acryl polyol, etc.

The hydroxyl value of such a polyol (C) is preferably from 10 to 600 mgKOH/g. When a plurality of polyols (C) are used in combination, as the polyol (C), the hydroxyl value of each polyol may be within the above range.

The content of the polyol (C) in the polyol (P) (100 mass %) is preferably at most 10 mass %, more preferably at most 8 mass %.

The polyol (P) is a polyol comprising the above described polyesterpolyol (A), polyetherpolyol (B) and polymer-dispersed polyol (Z). Further, it may contain an optional polyol (C). A preferred polyol (P) is a polyol comprising from 50 to 90 mass % of the polyesterpolyol (A), from 5 to 50 mass % of the polyetherpolyol (B) and from 0.1 to 15 mass % of the polymer-dispersed polyol (Z) (provided that the total of (A), (B) and (Z) is 100 mass %), wherein the mass proportion of the fine polymer particles (M) is from 0.02 to 10 mass % to the total mass (100 mass %) of the polyetherpolyol (B) and the polymer-dispersed polyol (Z).

The average hydroxyl value of the polyol (P) is from 100 to 450 mgKOH/g, preferably from 100 to 400 mgKOH/g, more preferably from 150 to 400 mgKOH/g. The average hydroxyl value of the polyol (P) means the mass averaged value of the hydroxyl values of all polyol compounds constituting the polyol (P).

When the average hydroxyl value of the polyol (P) is at least 100 mgKOH/g, the obtainable rigid foam will have an excellent strength. When the average hydroxyl value of the polyol (P) is at most 450 mgKOH/g, the obtainable rigid foam will be substantially free from brittleness, and it is possible to reduce the amount of the polyisocyanate (I) to be used.

<Polyisocyanate (I)>

The polyisocyanate (I) in the present invention is not particularly limited so long as it is a polyisocyanate compound which is commonly used for the production of a rigid foam, and it may, for example, be an aromatic, alicyclic or aliphatic polyisocyanate having at least two isocyanate groups; a mixture of two or more types of such polyisocyanates; or a modified polyisocyanate obtainable by modifying such a polyisocyanate.

A specific example may, for example, be a polyisocyanate such as tolylene diisocyanate (TDI), diphenylmethane diisocyanate (MDI), polymethylene polyphenyl polyisocyanate (so-called crude MDI), xylylene diisocyanate (XDI), isophorone diisocyanate (IPDI) or hexamethylene diisocyanate (HMDI), or a prepolymer-type modified product, isocyanurate modified product, urea modified product or carbodiimide modified product thereof. Among them, TDI, MDI, crude MDI or a modified product thereof is preferred.

Such polyisocyanates (I) may be used alone or in combination as a mixture of two or more of them.

In the present invention, the amount of the polyisocyanate (I) to be used is adjusted so that the isocyanate index will be over 200 and at most 400. The isocyanate index means a value obtained by multiplying 100 times a value obtained by dividing the isocyanate equivalent of the polyisocyanate (I) by the hydroxyl equivalent of the polyol (P). When the isocyanate index is higher than 200, the ratio of nulate rings formed by a trimerization reaction of isocyanate becomes high, whereby sufficient flame retardancy can be imparted to the obtainable rigid foam. On the other hand, if the ratio of nulate rings becomes too high, the rigid foam tends to be too stiff, thus leading to such a trouble that the rigid foam becomes brittle. Accordingly, when the isocyanate index is within the above range, it is possible to impart proper flame retardancy while maintaining the strength of the rigid foam.

The amount of the polyisocyanate (I) to be used, is more preferably such that the isocyanate index will be from 250 to 380.

[Blowing Agent]

In the present invention, as a blowing agent, at least a $C_{2-8}$ hydrocarbon compound and water are used.

By using a $C_{2-8}$ hydrocarbon compound, the compatibility of the blowing agent with the polyol (P) will be improved. The moldability of the rigid foam will thereby be improved, and a rigid foam having good properties can be obtained.

The above hydrocarbon compound has from 2 to 8 carbon atoms, preferably from 3 to 6 carbon atoms, more preferably 4 or 5 carbon atoms, particularly preferably 5 carbon atoms.

Such a hydrocarbon compound is preferably used in an amount of from 5 to 50 parts by mass, more preferably from 5 to 40 parts by mass, per 100 parts by mass of the polyol (P).

Specifically, such a hydrocarbon compound is preferably at least one member selected from the group consisting of propane, butane, n-pentane, isopentane, cyclopentane, hexane and cyclohexane, whereby the compatibility with the polyol component will be good. Among them, butane, n-pentane, isopentane or cyclopentane is more preferred, and isopentane or cyclopentane is further preferred.

These hydrocarbon compounds may be used alone or in combination as a mixture of two or more of them.

Further, when water is used in combination therewith, as a blowing agent, foaming effects will be improved, whereby it is possible to reduce the weight of the rigid foam.

The amount of water to be used is preferably from 0.1 to 10 parts by mass, more preferably from 0.3 to 5 parts by mass, per 100 parts by mass of the above polyol (P).

Further, as the blowing agent, in addition to the $C_{2-8}$ hydrocarbon compound, it is possible to use, for example, an inert gas or a hydrocarbon compound other than one having from 2 to 8 carbon atoms, in combination.

[Foam Stabilizer]

In the present invention, a foam stabilizer is used in order to form good cells.

The foam stabilizer in the present invention is not particularly limited, and a silicone-type foam stabilizer or a fluorinated compound type foam stabilizer is preferred. Among them, a silicone-type foam stabilizer having a high foam stabilizing effect is particularly preferred.

Such foam stabilizers may be used alone or in combination as a mixture of two or more of them. The amount of the foam stabilizer to be used is preferably from 0.1 to 20 parts by mass, more preferably from 0.2 to 15 parts by mass, per 100 parts by mass of the above polyol (P).

[Catalyst]

The catalyst in the present invention is not particularly limited so long as it is a catalyst to promote an urethane-forming reaction. However, it is preferred to use in combination a catalyst to promote a trimerization reaction of the isocyanate group.

As the catalyst to promote the urethane-forming reaction, the tertiary amine catalyst is preferred.

The tertiary amine may, for example, be a tertiary amine compound such as N,N,N',N'-tetramethylethylene diamine, N,N,N',N'-tetramethylpropylene diamine, N,N,N',N'',N''-pentamethyldiethylene triamine, N,N,N',N'',N''-pentamethyl-(3-aminopropyl)ethylene diamine, N,N,N',N'',N''-pentamethyldipropylene triamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylene diamine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole, 1-dimethylaminopropylimidazole or N-methyl-N—(N,N-dimethylaminoethyl)ethanolamine, etc. As the tertiary amine, pentamethyldiethylenetriamine having a high catalytic activity, its preferred.

Whereas, the catalyst to promote a trimerization reaction of the isocyanate group is preferably a quaternary ammonium salt catalyst, or a metal salt of a carboxylic acid such as potassium acetate or potassium 2-ethylhexanoate.

The quaternary ammonium salt catalyst may, for example, be a tetraalkylammonium halide such as tetramethylammonium chloride, etc., a tetraalkylammonium hydroxide such as tetramethylammonium hydroxide, etc., a tetraalkylammonium organic acid salt such as tetramethylammonium 2-ethylhexanoate, 2-hydroxypropyltrimethylammonium formate or 2-hydroxypropyltrimethylammonium 2-ethylhexanoate, or a quaternary ammonium compound obtainable by subjecting a quaternary ammonium carbonate obtainable by reacting a tertiary amine such as N,N,N',N'-tetramethylethylene diamine with a diester carbonate to an anion exchange reaction with 2-ethylhexanoic acid.

These catalyst may be used alone or in combination as a mixture of two or more of them.

The amount of the catalyst to be used is preferably from 0.5 to 15 parts by mass, more preferably from 1 to 10 parts by mass, per 100 parts by mass of the polyol (P).

[Other Additives]

In the present invention, optional additives may be used as the case requires.

Such additives may, for example, be a filler such as calcium carbonate or barium sulfate; an anti-aging agent such as an antioxidant or an ultraviolet absorber; an anti-cell stabilizer, a plasticizer, a colorant, a mildew-preventing agent, a foam breaker, a dispersing agent and a discoloration-preventing agent.

<Production Process>

The production process of the present invention is a process for producing a rigid foam, which comprises reacting the polyol (P) with the polyisocyanate (I) in the presence of the blowing agent, the foam stabilizer and the catalyst. The process of the present invention is particularly suitable for the production of a board-form rigid foam such as a building material panel, etc.

At the time of the production, it is preferred to preliminarily prepare the polyol (P) and prepare a mixture of the polyol (P) with some or all components other than the polyisocyanate (I) (hereinafter referred to as a polyol system liquid). Then, the polyol system liquid and the polyisocyanate (I) are mixed to carry out foaming. In a case where the polyol (P) and some components other than the polyisocyanate (I) are mixed to obtain a polyol system liquid, the remaining components may be mixed at the time of mixing with the polyisocyanate (I).

The blowing agent may be preliminarily incorporated to the polyol system liquid or may be preliminarily blended to both the polyol system liquid and the polyisocyanate (I), or it may be incorporated after mixing the polyol system liquid and the polyisocyanate (I). It is particularly preferred to preliminarily incorporate the blowing agent to the polyol system liquid.

For forming the rigid foam in the present invention, either a high pressure foaming apparatus or a low pressure foaming apparatus may be used.

As an example of the production process employing such a foaming apparatus, a process may be mentioned wherein on a substrate, a mixture of the polyol system liquid and the polyisocyanate (I) (the mixture having the remaining components mixed in a case where the polyol system liquid contains some components other than the polyisocyanate (I)) is poured, and then, foaming and curing in a board-form in a state where they are clamped by the foaming apparatus, to produce a rigid foam.

The substrate may, for example, be various types of a laminate film constituted by polyethylene and craft paper, or a metal sheet material such as an aluminum or Galvalume steel plate.

Otherwise, it may be a process wherein on a substrate, a mixture of the polyol system liquid and the polyisocyanate (I) (a mixture having also the remaining components mixed in a case where the polyol system liquid contains only some components other than the polyisocyanate (I)) is poured, followed by foaming in an open state (slave foaming), and then the obtained rigid foam is cut out depending upon the particular application to form a board.

According to the process for producing a rigid foam of the present invention, the rigid foam can be made lightweight in such a state that it is provided with both excellent heat insulating properties and dimensional stability. The process of the present invention is preferably applied to the production of a rigid foam having a foam core density of from 15 to 40 kg/m$^3$, more preferably from 15 to 30 kg/m$^3$.

The foam core density of the rigid foam can be controlled by adjusting the amount of the blowing agent.

Here, the foam core density can be measured by the method disclosed in JIS A9511.

EXAMPLES

Now, the present invention will be described in detail with reference to Examples and Comparative Examples. However, it should be understood that the present invention is by no means restricted by the following description. Further, in these Examples, "parts" means "parts by weight", "EO" represents ethylene oxide, and "PO" represents propylene oxide. Further, the hydroxyl value is a value measured in accordance with JIS K1557 (1970 edition).

<Materials>

Now, materials used for the production of rigid foams in Examples and their production Examples will be described.

[Polyesterpolyol (A)]

Polyesterpolyol A-1: a polyesterpolyol having a hydroxyl value of 227 mgKOH/g, obtained by polycondensation of diethylene glycol with terephthalic acid.

Polyesterpolyol A-2: a polyesterpolyol having a hydroxyl value of 250 mgKOH/g, obtained by polycondensation of diethylene glycol with terephthalic acid.

Polyesterpolyol A-3: a polyesterpolyol having a hydroxyl value of 315 mgKOH/g, obtained by polycondensation of diethylene glycol with terephthalic acid.

[Polyetherpolyol (B)]

(Polyol B1)

Polyol B1-1: a polyetherpolyol having a hydroxyl value of 350 mgKOH/g, obtained by ring-opening addition polymerization of EO, PO and EO in this order by using toluene diamine as an initiator.

Polyol B1-2: a polyetherpolyol having a hydroxyl value of 430 mgKOH/g, obtained by ring-opening addition polymerization of PO and EO in this order by using, as an initiator, a Mannich compound obtained by reacting 1 mol of nonylphenol with 2.2 mol of formaldehyde and 2.2 mol of diethanolamine.

Polyol B1-3: a polyetherpolyol having a hydroxyl value of 300 mgKOH/g, obtained by ring-opening addition polymerization of PO and EO in this order by using, as an initiator, a Mannich compound obtained by reacting 1 mol of nonylphenol with 1.4 mol of formaldehyde and 2.2 mol of diethanolamine.

Polyol B1-4: a polyetherpolyol having a hydroxyl value of 280 mgKOH/g, obtained by ring-opening addition polymerization of EO using bisphenol A as an initiator.

(Polyol (B2))

Polyol B2-1: a polyetherpolyol having a hydroxyl value of 350 mgKOH/g, obtained by ring-opening addition polymerization of EO by using 1-(2-aminoethyl)piperazine as an initiator.

Polyol B2-2: a polyetherpolyol having a hydroxyl value of 760 mgKOH/g, obtained by ring-opening addition polymerization of PO by using ethylene diamine as an initiator.

Polyol B2-3: a polyetherpolyol having a hydroxyl value of 350 mgKOH/g, obtained by ring-opening addition polymerization of PO by using monoethanolamine as an initiator.

Polyol B2-4: a polyetherpolyol having a hydroxyl value of 500 mgKOH/g, obtained by ring-opening addition polymerization of PO by using monoethanolamine as an initiator.

(Polyol (B3))

Polyol B3-1: a polyetherpolyol having a hydroxyl value of 360 mgKOH/g, obtained by ring-opening addition polymerization of PO by using pentaerythritol as an initiator.

Polyol B3-2: a polyetherpolyol having a hydroxyl value of 400 mgKOH/g, obtained by ring-opening addition polymerization of PO by using glycerol as an initiator.

[Polymer-Dispersed Polyol (Z)]

The polymer-dispersed polyol (Z) was prepared by the following method. As the base polyol (W), the following polyetherpolyol W1-1, the following polyol W2-1 and the following polyol W2-2 were used.

Polyol W1-1: a polyetherpolyol having a hydroxyl value of 50 mgKOH/g, obtained by random ring-opening addition polymerization of EO and PO by using glycerol as an initiator. The proportion of EO to the total amount of PO and EO subjected to the ring-opening addition polymerization was 70 mass %.

Polyol W2-1: the same polyetherpolyol as the above-mentioned polyol B2-2.

Polyol W2-2: a polyetherpolyol having a hydroxyl value of 650 mgKOH/g, obtained by ring-opening addition polymerization of PO by using glycerol as an initiator. As the monomer having a polymerizable unsaturated bond to form fine polymer particles (M), acrylonitrile (AN), vinyl acetate (Vac) and methyl methacrylate (MMA) were used.

Production Example 1

Polymer-Dispersed Polyol (Z-1)

Into a 5 L pressurized reactor, the base polyol (W), monomers and AMBN as a polymerization initiator were all charged in the mass ratios as shown in Table 1. Then, with stirring, the temperature was raised, and while maintaining the reaction solution at 80° C., the reaction was carried out for 10 hours The reaction rate of the monomers was at least 80%. After completion of the reaction, unreacted monomers were removed by carrying out reduced pressure deaeration by heating at 110° C. under 20 Pa for two hours to obtain a polymer-dispersed polyol Z-1.

Production Examples 2 and 3

Polymer-Dispersed Polyols (Z-2) and (Z-3)

Into a 5 L pressurized reactor, 70 mass % of the base polyol (W) as shown in Table 1 was charged, and while maintaining the temperature at 120° C., a mixture comprising the rest of the base polyol (W), monomers and AMBN was fed over a period of two hours with stirring, and after completion of the feeding, stirring was continued for about 0.5 hour at the same temperature. In each of Production Examples 2 and 3, the reaction rate of the monomers was at least 80%. After completion of the reaction, unreacted monomers were removed by reduced pressure deaeration by heating at 120° C. under 20 Pa to obtain a polymer-dispersed polyol Z-2 or Z-3. With respect to each of the polymer-dispersed polyols Z-1 to Z-3 obtained in Production Examples 1 to 3, the hydroxyl value and the viscosity at 25° C. of the base polyol (W) are shown in Table 1. The unit in Table 1 is "parts by mass".

Further, the viscosity (25° C.) was measured by a B-model viscometer.

TABLE 1

|  |  | Production Example 1 | Production Example 2 | Production Example 3 |
|---|---|---|---|---|
| Base polyol (W) | W1-1 | 900 | 1,420 | 900 |
|  | W2-1 | 450 | — | 225 |
|  | W2-2 | 900 | 830 | 1,125 |
| Monomers for fine polymer particles (M) | AN | 150 | 400 | 400 |
|  | Vac | 600 | — | — |
|  | MMA | — | 350 | 350 |
| Polymerization initiator | AMBN | 30 | 30 | 30 |
| Hydroxyl value of (W) [mgKOH/g] |  | 432 | 271 | 421 |
| Viscosity [mPa · s/25° C.] |  | 1,500 | 2,600 | 2,600 |
| Polymer-dispersed polyol (Z) |  | Z-1 | Z-2 | Z-3 |

[Flame Retardant]
  Flame retardant: tris(2-chloropropyl)phosphate (tradename: Fyrol PCF, manufactured by Supresta Japan)
[Blowing Agents]
  Blowing agent H-1: water
  Blowing agent H-2: cyclopentane (tradename: MARUKASOL FH, manufactured by Maruzen Petrochemical Co., Ltd.)
  Blowing agent H-3: n-pentane
  Blowing agent H-4: isopentane
[Foam Stabilizers]
  Foam stabilizer S-1: silicone foam stabilizer (tradename: SH-193, manufactured by Dow Corning Toray)
  Foam stabilizer S-2: silicone foam stabilizer (tradename: SF-2937F, manufactured by Dow Corning Toray)
[Catalyst]
  Catalyst T-1: pentamethyldiethylene triamine (tradename: TOYOCAT DT, manufactured by TOSOH CORPORATION)
  Catalyst T-2: quaternary ammonium salt catalyst (tradename: TOYOCAT TRX, manufactured by TOSOH CORPORATION)
  Catalyst T-3: diethylene glycol solution of potassium 2-ethylhexanoate (tradename: PUCAT 15G, manufactured by NIHON KAGAKU SANGYO CO., LTD.)
[Polyisocyanate (I)]
  Polyisocyanate 1-1: polymethylenepolyphenyl polyisocyanate (crude MDI) (tradename: MR-200, manufactured by Nippon Polyurethane Industry Co., Ltd.)<
<Production of Rigid Foam>
  By using the above materials, a rigid isocyanurate foam as a rigid foam was produced.
  In each Example, a polyol system liquid was prepared by adjusting, per 100 parts of a polyol (P), the amount of a catalyst to be such an amount that is required to make the cream time to be from 7 to 12 seconds and to make the gel time to be from 25 to 35 seconds at the hand foaming, and the amounts of a foam stabilizer, a flame retardant and a blowing agent to be such amounts that are required to make the foam core density to be from 23 to 26 kg/m$^3$.
(Cream Time)
  For the measurement of the cream time, the starting time for mixing the polyol system liquid and the polyisocyanate component was taken as 0 second, and the time (seconds) till the mixed liquid started foaming was measured.
(Gel Time)
  For the measurement of the gel time, a wire was inserted into a foam during foaming, and the time (seconds) till it became stringy when the wire was pulled out, was measured.
(Foam Core Density)
  For the measurement of the foam core density (unit: kg/m$^3$), a core portion of the obtained rigid foam was cut out in a size of 100 mm×100 mm×100 mm, and the mass was measured by a precision balance, and the size of the core portion was accurately measured by using a digital caliper, whereupon the volume was obtained. The foam core density was calculated by dividing the measured mass by the volume.

Example 1

In a 1 L plastic beaker, as the polyol (P), a mixture of polyesterpolyol A-1 (90 parts), polyetherpolyol (B) comprising polyol B1-1 (2.5 parts), polyol B2-1 (1.3 parts), polyol B3-1 (2.5 parts) and polyol B3-2 (2.4 parts), and polymer-dispersed polyol (Z-1) (1.3 parts), was put, and further, the flame retardant (10 parts), foam stabilizer S-1 (2 parts), catalyst T-1 (0.5 part), catalyst T-2 (3.0 parts), blowing agent H-1 (1 part) and blowing agent (H-2) (21 parts) were put, followed by mixing to obtain a polyol system liquid.
  Then, the polyol system liquid and polyisocyanate 1-1 (isocyanate index: 250) were simultaneously held at a liquid temperature of 20° C., and they were stirred for 5 seconds at a rotational speed of 3,000 rpm by using a stirring device having disk-shaped stirring vanes mounted on a drilling press manufactured by Hitachi, Ltd., to obtain a mixed liquid. Thereafter, the mixed liquid was filled in a wood form of 200 mm×200 mm×200 mm fitted with a release bag made of polyethylene and foamed to obtain a rigid foam.

Examples 2 to 15

A rigid foam was produced in the same manner as in Example 1 except that the composition of the polyol (P), the polyisocyanate (I), the foam stabilizer, the catalyst and the blowing agent was changed as shown in Tables 2 and 3.

Comparative Examples 1 to 6

A rigid foam was produced in the same manner as in Example 1 except that the composition of the polyol (P), the polyisocyanate (I), the foam stabilizer, the catalyst and the blowing agent was changed as shown in Table 4.
[Evaluation Methods]
  In each Example, the dimensional stability, the heat conductivity at 24° C. and the above-mentioned foam core density, of the obtained rigid foam, were respectively evaluated.
(Evaluation of Dimensional Stability)
  The dimensional stability was measured by a method in accordance with ASTM D2126-75 under a low temperature condition.
  A rigid polyurethane foam obtained by foaming was aged for one hour and then cut out in a size of 100 mm height×150 mm width×75 mm thickness to obtain a test specimen.
  For the dimensional stability at a low temperature, the test specimen was stored in an atmosphere of −30° C. for 24 hours, and the proportion of the changed thickness to the thickness before the storage was represented by the dimensional change (unit: %).
  Here, in the dimensional change, a negative numerical value means shrinkage, and the absolute value being large means that the dimensional change is large.
(Evaluation of Heat Conductivity)
  The heat conductivity at 24° C. (unit: mW/m·K) was measured in accordance with JIS A1412 by using a heat conductivity-measuring apparatus (AUTO Λ HC-074 model, manufactured by EKO INSTRUMENTS CO., LTD.).
  The results of evaluation in Examples and Comparative Examples are shown in Tables 2 to 4. The unit in Tables 2 to 4 is "parts by mass".

TABLE 2

| | | Examples | | | | | | | |
| --- | --- | --- | --- | --- | --- | --- | --- | --- | --- |
| | | 1 | 2 | 3 | 4 | 5 | 6 | 7 | 8 |
| Polyesterpolyol (A) | A-1 | 90 | 80 | 80 | 80 | 80 | 90 | 80 | — |
| | A-2 | — | — | — | — | — | — | — | 80 |
| | A-3 | — | — | — | — | — | — | — | — |

TABLE 2-continued

| | | | Examples | | | | | | | |
|---|---|---|---|---|---|---|---|---|---|---|
| | | | 1 | 2 | 3 | 4 | 5 | 6 | 7 | 8 |
| Polyether polyol (B) | Polyol (B1) | B1-1 | 2.5 | 5 | 5 | 5 | 5 | 2.5 | — | 5 |
| | | B1-2 | — | — | — | — | — | — | 2.8 | — |
| | | B1-3 | — | — | — | — | — | — | — | — |
| | | B1-4 | — | — | — | — | — | — | 14.4 | — |
| | Polyol (B2) | B2-1 | 1.3 | 2.6 | 2.6 | 2.6 | 2.6 | 1.3 | — | 2.6 |
| | | B2-2 | — | — | — | — | — | — | — | — |
| | | B2-3 | — | — | — | — | — | — | — | — |
| | | B2-4 | — | — | — | — | — | — | 0.8 | — |
| | Polyol (B3) | B3-1 | 2.5 | 5 | 5 | 5 | 5 | 2.5 | — | 5 |
| | | B3-2 | 2.4 | 4.8 | 4.8 | 4.8 | 4.8 | 2.4 | — | 4.8 |
| | Hydroxyl value [mgKOH/g] | | 367 | 367 | 367 | 367 | 367 | 367 | 313 | 367 |
| Polymer-dispersed polyol (Z) | | Z-1 | 1.3 | 2.6 | 2.6 | 2.6 | — | — | 2 | 2.6 |
| | | Z-2 | — | — | — | — | 2.6 | — | — | — |
| | | Z-3 | — | — | — | — | — | 1.3 | — | — |
| (M)/[(B) + (Z)] [mass %] | | | 3.3 | 3.3 | 3.3 | 3.3 | 3.3 | 3.3 | 2.5 | 3.3 |
| (M)/(P) [mass %] | | | 0.33 | 0.65 | 0.65 | 0.65 | 0.65 | 0.33 | 0.50 | 0.65 |
| Hydroxyl value of polyol P [mgKOH/g] | | | 240 | 253 | 253 | 253 | 253 | 240 | 244 | 272 |
| Flame retardant | TCPP | | 10 | 10 | 10 | 10 | 10 | 10 | 10 | 10 |
| Blowing agent | | H-1 | 1 | 1 | 1 | 1 | 1 | 1 | 1 | 1 |
| | | H-2 | 21 | 21 | 21 | 21 | 21 | 21 | 21 | 25 |
| | | H-3 | — | — | — | — | — | — | — | — |
| | | H-4 | — | — | — | — | — | — | — | — |
| Foam stabilizer | | S-1 | 2 | 2 | 5 | — | 2 | — | 5 | 5 |
| | | S-2 | — | — | — | 5 | — | 2 | — | — |
| Catayst | | T-1 | 0.5 | 0.5 | 0.5 | 0.5 | 0.5 | 0.5 | 0.5 | 0.5 |
| | | T-2 | 3.0 | 3.0 | 3.0 | 3.0 | 3.0 | 3.0 | 3.0 | 2.5 |
| | | T-3 | — | — | — | — | — | — | — | — |
| Isocyanate index | | | 250 | 250 | 250 | 250 | 250 | 250 | 250 | 250 |
| Foam core density [kg/m$^3$] | | | 23.7 | 23.6 | 23.9 | 24.2 | 24.0 | 23.8 | 26.5 | 23.8 |
| Dimensional stability at low temperature [%] | | | 1.0 | 1.3 | 0.9 | 3.3 | −1.8 | −1.9 | −1.7 | −1.0 |
| Heat conductivity [mW/m · K] | | | 20.1 | 21.6 | 20.7 | 21.3 | 20.8 | 21.0 | 20.8 | 21.1 |

TABLE 3

| | | | Examples | | | | | | |
|---|---|---|---|---|---|---|---|---|---|
| | | | 9 | 10 | 11 | 12 | 13 | 14 | 15 |
| Polyesterpolyol (A) | | A-1 | — | — | — | 60 | 90 | 80 | 90 |
| | | A-2 | — | 80 | 80 | — | — | — | — |
| | | A-3 | 80 | — | — | — | — | — | — |
| Polyether polyol (B) | Polyol (B1) | B1-1 | 5 | 5 | 5 | — | 2.5 | 5 | 2.5 |
| | | B1-2 | — | — | — | 38 | — | — | — |
| | | B1-3 | — | — | — | — | — | — | — |
| | | B1-4 | — | — | — | — | — | — | — |
| | Polyol (B2) | B2-1 | 2.6 | 2.6 | 2.6 | — | 1.3 | 2.6 | 1.3 |
| | | B2-2 | — | — | — | — | — | — | — |
| | | B2-3 | — | — | — | — | — | — | — |
| | | B2-4 | — | — | — | — | — | — | — |
| | Polyol (B3) | B3-1 | 5 | 5 | 5 | — | 2.5 | 5 | 2.5 |
| | | B3-2 | 4.8 | 4.8 | 4.8 | — | 2.4 | 4.8 | 2.4 |
| | Hydroxyl value [mgKOH/g] | | 367 | 367 | 367 | 430 | 367 | 367 | 367 |
| Polymer-dispersed polyol (Z) | | Z-1 | 2.6 | 2.6 | 2.6 | 2 | 1.3 | 2.6 | 1.3 |
| | | Z-2 | — | — | — | — | — | — | — |
| | | Z-3 | — | — | — | — | — | — | — |
| (M)/[(B) + (Z)] [mass %] | | | 3.3 | 3.3 | 3.3 | 1.3 | 3.3 | 3.3 | 3.3 |
| (M)/(P) [mass %] | | | 0.65 | 0.65 | 0.65 | 0.50 | 0.33 | 0.65 | 0.33 |
| Hydroxyl value of polyol P [mgKOH/g] | | | 306 | 272 | 272 | 306 | 240 | 253 | 240 |
| Flame retardant | TCPP | | 10 | 10 | 10 | 10 | 10 | 10 | 10 |
| Blowing agent | | H-1 | 1 | 1 | 1 | 1.5 | 1 | 1 | 1 |
| | | H-2 | 25 | — | 21 | 20 | 19 | 18 | 23 |
| | | H-3 | — | 21 | — | — | — | — | — |
| | | H-4 | — | — | — | — | — | 4 | — |
| Foam stabilizer | | S-1 | 5 | 5 | 5 | — | 5 | 5 | 5 |
| | | S-2 | — | — | — | 5 | — | — | — |
| Catalyst | | T-1 | 0.5 | 0.5 | 0.5 | 0.5 | 0.5 | 0.5 | 0.5 |
| | | T-2 | 2.5 | 2.5 | 1.0 | 2.5 | 2.0 | 1.0 | 1.2 |
| | | T-3 | — | — | 2.5 | — | — | 2.5 | 2.5 |

TABLE 3-continued

|  | Examples | | | | | | |
| --- | --- | --- | --- | --- | --- | --- | --- |
|  | 9 | 10 | 11 | 12 | 13 | 14 | 15 |
| Isocyanate index | 250 | 250 | 250 | 250 | 220 | 250 | 300 |
| Foam core density [kg/m$^3$] | 24.0 | 24.1 | 24.5 | 23.8 | 24.1 | 24.5 | 25.5 |
| Dimensional stability at low temperature [%] | 1.3 | 1.2 | −2.1 | −2.1 | −2.0 | −2.5 | −0.8 |
| Heat conductivity [mW/m · K] | 21.1 | 22.0 | 20.2 | 21.2 | 21.8 | 21.9 | 21.7 |

TABLE 4

|  |  |  | Comparative Examples | | | | | |
| --- | --- | --- | --- | --- | --- | --- | --- | --- |
|  |  |  | 1 | 2 | 3 | 4 | 5 | 6 |
| Polyesterpolyol (A) |  | A-1 | 100 | 70 | — | — | — | 90 |
|  |  | A-2 | — | — | 100 | 70 | 70 | — |
|  |  | A-3 | — | — | — | — | — | — |
| Polyether polyol (B) | Polyol (B1) | B1-1 | — | — | — | — | 9.4 | 2.5 |
|  |  | B1-2 | — | — | — | 13.5 | — | — |
|  |  | B1-3 | — | — | — | — | 3 | — |
|  |  | B1-4 | — | — | — | — | — | — |
|  | Polyol (B2) | B2-1 | — | — | — | — | — | 1.3 |
|  |  | B2-2 | — | 30 | — | — | 16.9 | — |
|  |  | B2-3 | — | — | — | 15 | — | — |
|  |  | B2-4 | — | — | — | — | — | — |
|  | Polyol (B3) | B3-1 | — | — | — | — | — | 2.5 |
|  |  | B3-2 | — | — | — | — | — | 2.4 |
|  | Hydroxyl value [mgKOH/g] |  | — | 760 | — | 388 | 584 | 367 |
| Polymer-disperse polyol (Z) |  | Z-1 | — | — | — | 1.5 | 0.7 | 1.3 |
|  |  | Z-2 | — | — | — | — | — | — |
|  |  | Z-3 | — | — | — | — | — | — |
| (M)/[(B) + (Z)] [mass %] |  |  | — | — | — | 1.25 | 0.58 | 3.25 |
| (M)/(P) [mass %] |  |  | 0 | 0 | 0 | 0.38 | 0.18 | 0.32 |
| Hydroxyl value of polyol P [mgKOH/g] |  |  | 227 | 387 | 250 | 290 | 348 | 240 |
| Flame retardant | TCPP |  | 10 | 10 | 10 | 10 | 10 | 10 |
| Blowing agent | H-1 |  | 1 | 1 | 1 | 1 | 1 | 1 |
|  | H-2 |  | 21 | 20 | 25 | 21 | 21 | 21 |
|  | H-3 |  | — | — | — | — | — | — |
|  | H-4 |  | — | — | — | — | — | — |
| Foam stabilizer | S-1 |  | 2 | 5 | 5 | 2 | 2 | 5 |
|  | S-2 |  | — | — | — | — | — | — |
| Catalyst | T-1 |  | 0.5 | 0.5 | 0.5 | 0.5 | 0.5 | 0.5 |
|  | T-2 |  | 2.5 | 2.5 | 2.5 | 2.5 | 2.8 | 1.0 |
|  | T-3 |  | — | — | — | — | — | 2.5 |
| Isocyanate index |  |  | 250 | 250 | 250 | 160 | 250 | 200 |
| Foam core density [kg/m$^3$] |  |  | 23.8 | 34.2 | 24.5 | 23.8 | 29.5 | 24.0 |
| Dimensional stability at low temperature [%] |  |  | −46.7 | −1.7 | −42.3 | −1.1 | −2.4 | −8.2 |
| Heat conductivity [mW/m · K] |  |  | 20.2 | 20.2 | 20.0 | 24.5 | 20.2 | 21.3 |

As shown in Tables 2 and 3, in Examples 1 to 15 employing the process of the present invention, it was possible to obtain a rigid foam excellent in both dimensional stability and heat-insulating properties in such a low density region that the foam core density was from 23 to 26 kg/m$^3$. That is, by adjusting the content of the polyesterpolyol (A) in the polyol (P) to be from 50 to 95 mass %, using the predetermined polyols and adjusting the isocyanate index to be over 200 and not more than 400, it was possible to obtain a rigid foamed synthetic resin provided with both excellent dimensional stability and heat-insulating properties and having the weight reduced.

On the other hand, as shown in Table 4, in Comparative Examples 1 and 3 wherein the polyetherpolyol (B) and the polymer-dispersed polyol (Z) were not used, the dimensional stability remarkably decreased, when the foam core density was made to be low at a level of 23.8 or 24.5 kg/m$^3$.

Further, in Comparative Example 2 wherein the polymer-dispersed polyol (Z) was not used, the foam core density became as high as 34.2 kg/m$^3$ in order to satisfy both the dimensional stability and heat-insulating properties, whereby it was not possible to reduce the weight.

Further, in Comparative Example 4 wherein the isocyanate index was made to be 160, when the foam core density was made to be low at a level of 23.8 kg/m$^3$, the heat-insulating properties remarkably deteriorated, although the dimensional stability was good.

Further, in Comparative Example 6 wherein the isocyanate index was made to be 200, although the heat conductivity was good at a level of 21.3 mW/m-K, the dimensional stability was decreased, and it was not possible to satisfy both the heat-insulating properties and the dimensional stability.

Further, in Comparative Example 5 wherein the hydroxyl value of the polyetherpolyol (B) was as high as 584 mg KOH/g, in order to satisfy both the dimensional stability and the heat-insulating properties, the foam core density became as high as 29.5 kg/m³, whereby it was not possible to reduce the weight.

INDUSTRIAL APPLICABILITY

According to the process of the present invention, it is possible to obtain a rigid foamed synthetic resin provided with both excellent dimensional stability and heat-insulating properties and having the weight reduced, and accordingly, the process can suitably be used for the production of a rigid foam for application to e.g. building material panels.

The entire disclosure of Japanese Patent Application No. 2008-141795 filed on May 30, 2008 including specification, claims and summary is incorporated herein by reference in its entirety.

What is claimed is:

1. A process for producing a rigid foamed synthetic resin, the process comprising:
    reacting a polyol (P) with a polyisocyanate (I) in the presence of a blowing agent, a foam stabilizer, and a catalyst,
    wherein the blowing agent comprises a $C_{2-8}$ hydrocarbon compound and water,
    wherein the polyol (P) comprises a polyesterpolyol (A) having a hydroxyl value of from 100 to 400 mgKOH/g, obtained by polycondensation of a monomer comprising an aromatic compound, a polyetherpolyol (B) having an average hydroxyl value of from 100 to 500 mgKOH/g, and a polymer-dispersed polyol (Z) having fine polymer particles (M) dispersed in a base polyol (W);
    wherein a content of the polyesterpolyol (A) in the polyol (P), based on 100 mass % of the polyol (P), is from 50 to 95 mass %,
    wherein a total content of the polyetherpolyol (B) and the polymer-dispersed polyol (Z) in the polyol (P), based on 100 mass % of the polyol (P), is from 5 to 50 mass %,
    wherein a mass proportion of the fine polymer particles (M) to a total mass (100 mass %) of the polyetherpolyol (B) and the polymer-dispersed polyol (Z) is from 0.02 to 10 mass %,
    wherein a isocyanate index of the polyol (P) and the polyisocyanate (I) is over 200 and at most 400; and
    wherein the polyol (P) has an average hydroxyl value of from 100 to 450 mgKOH/g.

2. The process of claim 1, wherein the polyetherpolyol (B) comprises at least one of a
    Polyol (B1), a polyoxyalkylenepolyol having an average hydroxyl value of from 100 to 700 mgKOH/g, obtained by ring-opening addition polymerization of an alkylene oxide with an initiator comprising an aromatic compound,
    and
    Polyol (B2), a polyoxyalkylenepolyol having an average hydroxyl value of from 100 to 800 mgKOH/g, obtained by ring-opening addition polymerization of an alkylene oxide with an initiator comprising at least one of an aliphatic amine and an alicyclic amine.

3. The process of claim 2, wherein the polyetherpolyol (B) comprises at least one polyol (B1) wherein the initiator for (B1) is selected from the group consisting of a Mannich condensate, diaminotoluene, and bisphenol A.

4. The process of claim 2, wherein the polyetherpolyol (B) comprises the polyol (B2), and
    wherein the initiator for (B2) comprises a piperazine.

5. The process of claim 1, wherein the $C_{2-8}$ hydrocarbon compound of the blowing agent comprises at least one selected from the group consisting of propane, butane, n-pentane, isopentane, cyclopentane, hexane, and cyclohexane.

6. The process of claim 1, wherein the $C_{2-8}$ hydrocarbon compound of the blowing agent is present in an amount of from 5 to 50 parts by mass per 100 parts by mass of the polyol (P).

7. The process of claim 1, wherein a mass proportion of the fine polymer particles (M) in the polyol (P), based on 100 mass % of the polyol (P), is from 0.001 to 5 mass %.

8. The process of claim 1, wherein the base polyol (W) comprises at least 5 mass %
    Polyetherpolyol (W1), a polyetherpolyol having an average hydroxyl value of at most 84 mgKOH/g and an oxyethylene group content of at least 40 mass % in the entire polyetherpolyol (W1).

9. The process of claim 1, wherein the base polyol (W) has an average hydroxyl value of from 200 to 800 mgKOH/g, and
    wherein the fine polymer particles (M) are fine polymer particles obtained by polymerization of a monomer comprising acrylonitrile.

10. The process of claim 2, wherein the polyol (B2) is present and the initiator for polyol (B2) comprises an alicyclic amine.

11. The process of claim 2, wherein the polyol (B2) is present and the initiator for polyol (B2) comprises an aliphatic amine.

12. The process of claim 2, wherein the polyol (B2) is present and the initiator for (B2) comprises an aliphatic amine and an alicyclic amine.

13. The process of claim 2, wherein the polyol (B1) is present and the initiator for (B1) comprises a Mannich condensate.

14. The process of claim 2, wherein the polyol (B1) is present and the initiator for (B1) comprises diaminotoluene.

15. The process of claim 2, wherein the polyol (B1) is present and the initiator for (B1) comprises bisphenol A.

16. The process of claim 1, wherein the blowing agent comprises butane.

17. The process of claim 1, wherein the blowing agent comprises n-pentane.

18. The process of claim 1, wherein the blowing agent comprises cyclopentane.

19. The process of claim 1, wherein the blowing agent comprises isopentane.

20. The process of claim 1, wherein the blowing agent comprises isopentane and cyclopentane.

* * * * *